(12) United States Patent
Butters et al.

(10) Patent No.: US 7,837,952 B2
(45) Date of Patent: Nov. 23, 2010

(54) SYSTEM AND METHOD FOR REMOVAL OF HYDROGEN PEROXIDE FROM A CONTAMINATED MEDIA

(76) Inventors: Brian E. Butters, 340 Sovereign Road, London, Ontario (CA) N6M 1A8; Anthony L. Powell, 51 Laurel Court, London, Ontario (CA) N6H 4W2

( * ) Notice: Subject to any disclaimer, the term of this patent is extended or adjusted under 35 U.S.C. 154(b) by 0 days.

(21) Appl. No.: 12/045,328

(22) Filed: Mar. 10, 2008

(65) Prior Publication Data

US 2008/0245746 A1    Oct. 9, 2008

Related U.S. Application Data

(60) Provisional application No. 60/893,894, filed on Mar. 9, 2007.

(51) Int. Cl.
*C02F 1/32* (2006.01)
*B01J 19/08* (2006.01)

(52) U.S. Cl. .............................. 422/186.3; 210/748.01

(58) Field of Classification Search ................ 210/748, 210/759, 760, 762, 763; 204/193, 157.15, 204/157.4, 157.6
See application file for complete search history.

(56) References Cited

U.S. PATENT DOCUMENTS 5,174,877 A * 12/1992 Cooper et al. ............... 204/193

5,755,977 A * 5/1998 Gurol et al. ................. 210/759

FOREIGN PATENT DOCUMENTS

KR       2003083831 A   * 11/2003

* cited by examiner

*Primary Examiner*—Walter D Griffin
*Assistant Examiner*—Cameron J Allen
(74) *Attorney, Agent, or Firm*—Baker & McKenzie LLP

(57) ABSTRACT

Disclosed herein are systems and methods for removing hydrogen peroxide from a liquid media. This is accomplished by adding an oxidizable metal to the photoreactive slurry. The oxidizable metal is then oxidized, which then causes the oxidized metal particles to bond to the particles of photoreactive slurry to create oxidized metal catalyst particles. Once bonded to the slurry particles, the metal remains in the decontamination system and its presence destabilizes and catalyzes the decomposition of the hydrogen peroxide in the contaminated media. Once destabilized, the hydrogen peroxide breaks down into water and oxygen particles, which are not detrimental to the operation of the system. The oxygen molecules may be vented from the system, while the water molecules simply mix with the liquid media flowing through the system. The photoreactive slurry and the oxidized metal are recovered and recycled so as not to have to be continuously replenished.

7 Claims, 1 Drawing Sheet

SYSTEM AND METHOD FOR REMOVAL OF HYDROGEN PEROXIDE FROM A CONTAMINATED MEDIA

CROSS-REFERENCE TO RELATED APPLICATIONS

This application claims the benefit of U.S. Provisional Pat. App. Ser. No. 60/893,894, filed on Mar. 9, 2007, and entitled "REMOVAL OF HYDROGEN PEROXIDE," which is commonly assigned with the present application and incorporated herein by reference for all purposes.

TECHNICAL FIELD

The present disclosure relates generally to purification systems and methods, and more particularly to systems and methods for removing hydrogen peroxide from contaminated fluids and other media.

BACKGROUND

Since almost all forms of life need water to survive, the improvement of water quality in decontamination systems has typically been a subject of significant interest. As a result, treatment systems and techniques for removing contaminants from contaminated fluids have been developed in the past. Prior approaches have included water treatment by applying various microorganisms, enzymes and nutrients for the microorganisms in water. Other approaches involve placing chemicals in the contaminated fluids, such as chlorine, in an effort to decontaminate supplies. Some such systems have proved to be somewhat successful; however, sever deficiencies in each approach may still be prominent.

Many modern contamination treatment systems employ photoreactive materials in a slurry that subject contaminants to a photocatalytic reaction. As a consequence of the photocatalytic reaction, contaminants will be destroyed and removed from the slurry. Chemical additives may be combined with the slurry before the slurry is subjected to a photocatalytic reaction by treatment system 116. Such an additive system is denoted by reference numeral 118. Chemical additives are preferably oxidants, such as air, oxygen, and hydrogen peroxide. Oxidants provide additional oxygen and balance the use of positive and negative charges.

However, although the decontamination industry favors the use of hydrogen peroxide in decontamination systems, its presence can also be detrimental in other regards in certain systems, such as photoreactive decontamination systems. In example of such a photocatalytic reactor may be found in U.S. Pat. No. 5,462,674, which is commonly assigned with the present disclosure and incorporated herein by reference in its entirety for all purposes. Because of its potential detrimental affects, removal of the peroxide is often desired. Unfortunately, peroxide removal in the industry is typically difficult and expensive. One way to remove it is to use catalase; however, such an approach is typically very expensive and is typically only used in laboratory environments. Raising the pH of the solution within the decontamination system is another approach, but this approach requires large amounts of basic additives, which is not typically suitable for portable or high quality water. In addition, this technique often requites a long retention time for the peroxide to be broken down. Accordingly, a technique for the quick and inexpensive removal of hydrogen peroxide for within decontamination systems is desired.

SUMMARY

Disclosed herein are systems and methods for efficiently removing hydrogen peroxide from contaminated liquid media. This is accomplished by adding an oxidizable metal to the photoreactive slurry used in photoreactive decontamination systems. The oxidizable metal is then oxidized using an ultraviolet light source, which then causes the oxidized metal particles to bond to the particles of photoreactive slurry to create oxidized metal catalyst particles. It is well known that the contact of various metals with hydrogen peroxide solutions result in the degradation of hydrogen peroxide molecules. The metals catalyze the decomposition of hydrogen peroxide. Oxidizing the metal allows it to bond to the slurry particles, and once bonded to the slurry particles, the metal remains in the decontamination system and its presence helps destabilize the hydrogen peroxide in the contaminated media. Once destabilized, the hydrogen peroxide breaks down into water and oxygen particles, which are not detrimental to the operation of the system. In addition, the slurry and the oxidized metal are recovered and recycled so as not to have to be continuously replenished.

In one exemplary embodiment, a system for removing hydrogen peroxide from a liquid media may comprise a photoreactive catalyst and an oxidizable metal to be added to a liquid media having hydrogen peroxide therein. Such a system may further comprise a reactor configured to receive the liquid media, the photoreactive catalyst and the oxidizable metal. An irradiation source in the reactor may be configured to irradiate the oxidizable metal to create an oxidized metal, such that the oxidized metal coats the photoreactive catalyst to create oxidized metal catalyst particles. Moreover, the reactor in such a system may be configured to promote turbulent mixing of the oxidized metal catalyst particles in the liquid media. Once mixed, the oxidized metal catalyst particles catalyze the decomposition of hydrogen peroxide molecules into oxygen and water.

In another embodiment, a system for removing hydrogen peroxide from a liquid media, may comprise a photoreactive catalyst and an oxidizable metal to be added to a liquid media having hydrogen peroxide therein. In these embodiments, the system may further include an irradiation source configured to irradiate the oxidizable metal to create an oxidized metal, such that the oxidized metal coats the photoreactive catalyst to create oxidized metal catalyst particles. Such systems may also include a reactor configured to receive the liquid media and the oxidized metal catalyst particles. The flow path in the reactor may be designed to promote turbulent mixing of the oxidized metal catalyst particles in the liquid media, where the oxidized metal catalyst particles catalyze the decomposition of hydrogen peroxide molecules into oxygen and water.

In another aspect, a method for removing hydrogen peroxide from a liquid media may be provided. In one embodiment, the method may comprise providing a liquid media having hydrogen peroxide therein. The method may also include combining a photoreactive catalyst and an oxidizable metal, and oxidizing the oxidizable metal with an irradiation source to create oxidized metal. The oxidized metal coats the photoreactive catalyst to create oxidized metal catalyst particles. The method may then include mixing the oxidized metal catalyst particles in the liquid media, were the oxidized metal catalyst particles catalyze the decomposition of hydrogen peroxide molecules into oxygen and water.

BRIEF DESCRIPTION OF THE DRAWINGS

Embodiments are illustrated herein by way of example in the accompanying figures, in which like reference numbers indicate similar parts, and in which.

DETAILED DESCRIPTION

Figure 1:
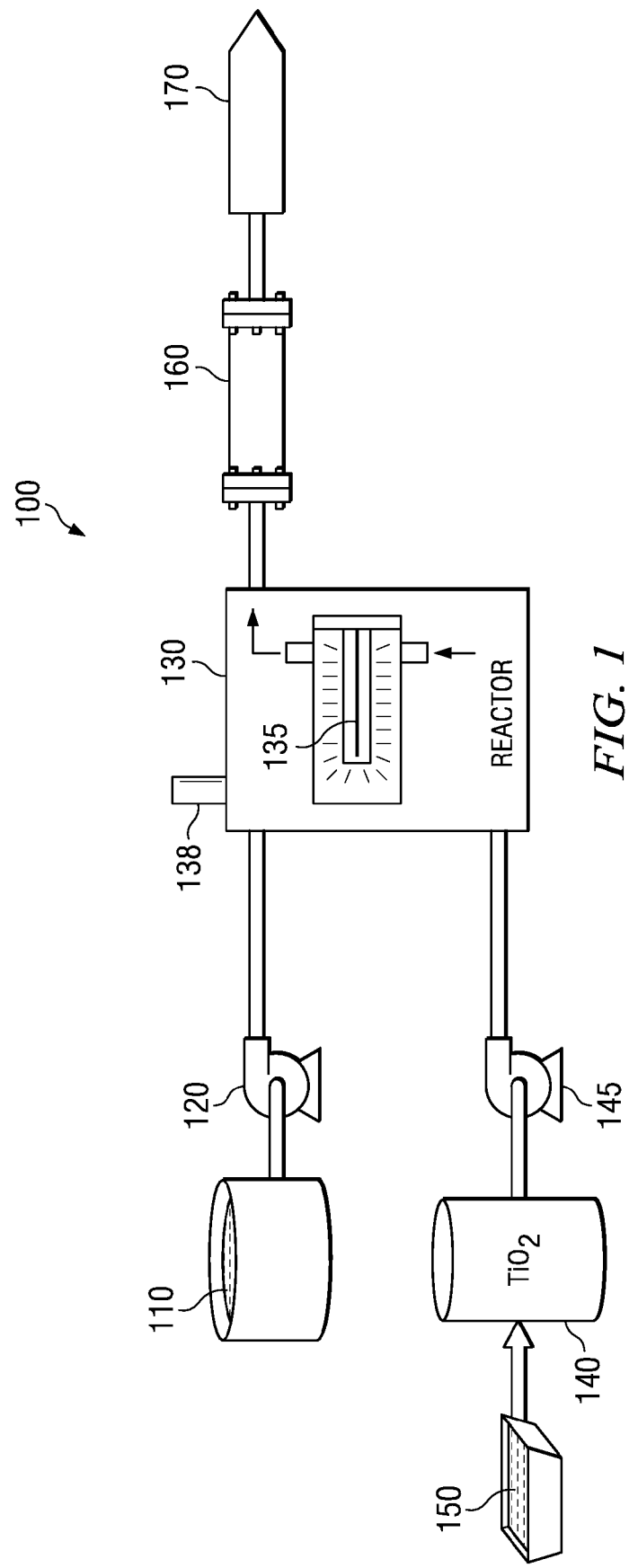
FIG. 1 illustrates one embodiment of a peroxide removal system for removing hydrogen peroxide from a liquid media and constructed in accordance with the disclosed principles.

FIG. 1 illustrates one embodiment of a peroxide removal system 100 for removing hydrogen peroxide from a liquid media and constructed in accordance with the disclosed principles. Depending on the application, the liquid media is typically water, which may be contaminated with harmful contaminants, or may be predominantly clean of such contaminants. Thus, the disclosed principles are applicable as part of a decontamination system, or may be implemented after a decontamination system has removed the contaminants from the liquid media.

The system 100 includes a source of the liquid media 110 containing hydrogen peroxide, which in this type of system 100 is water 110. Of course, other types of contaminated media may also be employed by the system 100. The liquid 110 may be retrieved from a storage tank or reservoir, or from any other available source. The liquid 110 is drawn from the reservoir via a pump 120, which in turn pumps the liquid 110 into a photoreactive reactor 130. In one embodiment, the reactor 130 is a photocatalytic reactor 130, however, it should be understood that any type of photolytic reactor employing photoreactive slurry and an irradiation source may also be used with the principles of the present disclosure.

The system 100 also includes a source of photoreactive slurry 140. The photoreactive slurry undergoes a photocatalytic reaction when irradiated with a light source, such an ultraviolet light source, within the reactor 130. The slurry 140 is pumped into the reactor 130 using a typical pump 145. The photocatalytic reactor 130 is operable to subject the slurry 130 to a photocatalytic reaction using the light or irradiation source 135. As a consequence of the photocatalytic reaction, contaminants within the contaminated media will be destroyed and removed from the slurry. In the illustrated embodiment, the photoreactive slurry is comprised of titanium dioxide ($TiO_2$), but other appropriate photoreactive substances are also within the broad scope of the present disclosure.

The system 100 also includes a supply of oxidizable metal 150. It is well known that the contact of various metals with hydrogen peroxide solutions result in the degradation of peroxide. Specifically, such metals catalyze the decomposition of peroxide via the following reaction:

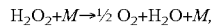

$$H_2O_2 + M \rightarrow \tfrac{1}{2} O_2 + H_2O + M,$$

where M is the oxidizable metal employed. In the illustrated embodiment, the oxidizable metal is an iron-based metal, such as ferric oxide. Of course, any type of oxidizable metal is envisioned and may be employed in accordance with the principles of the present disclosure.

In order to remove the hydrogen peroxide from the media in accordance with the disclosed principles, two key steps are provided. The first step is to cause the metal to contact the hydrogen peroxide particles in the contaminated media. The second step is to recover the metal from the contaminated media. In the illustrated embodiment, ferrous iron ($Fe^{2+}$) is oxidized onto a $TiO_2$ slurry via photocatalysis or other appropriate means. In this procedure, the ferrous iron is converted to ferric iron ($Fe^{3+}$), predominantly as ferric oxide. The ferric oxide coats the $TiO_2$ slurry particles, creating an iron (or metal) coating around the $TiO_2$ particles. Slurries other than $TiO_2$ could be used as well, or even metallic pellets, etc. depending on the desired application for the system 100.

The ferric iron laden $TiO_2$ slurry may then be added to the reactor 130. In some embodiments, the oxidizable metal and the slurry are separately added in the reactor 130, and the oxidizable metal is oxidized in the reactor so that it then coats the photoreactive slurry particles. In either embodiment, a flow path through the reactor 130 may be designed to promote high contact or mixing with the hydrogen peroxide laden media pumped into the reactor 130. One embodiment could be a photocatalytic reactor as envisioned in U.S. Pat. No. 5,462,674, since it is designed for high levels of mixing. Of course, other types of reactors may also be employed. In embodiments where the reactor 130 is employed to promote the bonding of the oxidizable metal with the slurry particles, the irradiation within the reactor 130 causes the oxidizable metal particles to bond to the photoreactive slurry particles. More specifically, UV light within the reactor 130 is applied to the iron laden slurry from the irradiation source 135 in order to ensure that all of the oxidizable metal is converted to its oxidized state (i.e., Ferric state), thus coating the slurry particles. Even if the oxidizable metal and photocatalyst slurry are pre-oxidized together before being added to the reactor 130, the irradiation in the reactor 130 from the irradiation source 135 helps maintain the oxidized metal in its oxidized state.

In other embodiments, the reactor 130 is not used to promote the bonding of the oxidizable metal to the slurry particles. In these embodiments, the slurry and oxidizable metal may be mixed ahead of being added to the reactor 130, where an irradiation source to promote the bonding of the oxidized metal to the slurry particles may be separately employed if desired. The oxidized metal/slurry mixture may then be added to the reactor 130 receiving the contaminated media having the undesirable levels of hydrogen peroxide. Such an embodiment may include the use of a tank (not illustrated) with an agitation device to promote mixing. In this tank, the oxidizable metal and slurry may be premixed before being used in the reactor 130.

Once the oxidized metal catalyst particles in the metal oxide laden slurry are present in the reactor 130, the reactor 130 may be operated in its normal capacity to remove contaminants from the incoming contaminated media 110. Specifically, the irradiation source 135 within the reactor 130, along with the $TiO_2$ in the slurry, work to decontaminate the contaminated media 110 as it passed through the reactor 130. In addition, however, the oxidizable metal in the slurry is also in contact with the media 110, which includes the hydrogen peroxide. As discussed above, the contact of the metal (e.g., ferric oxide particles bound to the $TiO_2$ particles) causes destabilization in the hydrogen peroxide molecules. In addition, the irradiation source 135 on the oxidized metal catalyst particles mixed with the liquid media also promotes the break down of the hydrogen peroxide.

In order to promote sufficient contact between the metal and the hydrogen peroxide molecules, turbulent mixing of the media and slurry is promoted, preferably in the reactor 130 itself. In the illustrated embodiment, the reactor 130 includes sleeves surrounding an irradiation source 135, which creates a small annulus between the two. In such embodiments, the contaminated media, as well as the metal laden slurry, may be passed through this annulus are a high velocity. The narrow size of the annulus combined with the curving shape of the annulus around the irradiation source 135 promotes a high turbulent mixing of the media and slurry, thereby promoting the through contact of the metal in the slurry with the hydrogen peroxide molecules in the media 110. In an exemplary embodiment, the fluid and slurry are passed through the annulus at a flow rate of about 1 meter per second or more when the annulus has a size of anywhere between about 1 mm to 12 mm, and preferably only about 1-2 mm.

As the hydrogen peroxide is decomposed, oxygen gas will be liberated in accordance with the equation set forth above. With any type of reactor 130 used, a vent 138 is used to remove the oxygen that would be released from the hydrogen peroxide decomposition. Also, the size of the reactor 130 could be selected based upon how much hydrogen peroxide there is to be removed and the flow rate of the incoming media stream 110. Furthermore, the irradiation source 135 within the reactor 130, in addition to causing the photocatalytic reaction with the $TiO_2$ to remove contaminants, also helps the oxidized metal to remain in its oxidized form (i.e., prevent iron reduction). Also, the irradiation with UV light would also speed up the decomposition of the hydrogen peroxide molecules.

As discussed above, the second step is to recover the metal laden photoreactive slurry. In the illustrated embodiment, the system 100 further includes a filter unit 160 downstream from the reactor 130, and which is used to segregate the slurry from the decontaminated media. More specifically, once a photocatalytic reaction has taken place, and thus the contaminants destroyed from the contaminated fluid, the photoreactive catalyst (i.e., slurry) is segregated from the decontaminated effluent. One embodiment of the filter 160 is to utilize a catalyst recovery system of the type disclosed in the above-mentioned U.S. Pat. No. 5,462,674. Such systems employ ceramic filters to segregate the slurry from the decontaminated media. Such systems generally provide continuous removal of the iron laden $TiO_2$, and allows it to be reused. In such embodiments, the slurry and oxidizable metal are thus recovered and recycled, preventing the need to replenish the system. Alternatively, the process could be a single pass operation.

In other advantageous embodiments, a backwashable filter unit 160 may be used to filter out the slurry. Once the filter unit 160 removes the slurry, the remaining media may then be discharged 170 from the system 100.

While various embodiments in accordance with the principles disclosed herein have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A system for removing hydrogen peroxide from a liquid media, the system comprising:
   a photoreactive catalyst source providing a photoreactive catalyst to the liquid media;
   an oxidized metal particles source providing oxidized metal particles to the liquid media;
   a slurry containing the photoreactive catalyst and the oxidized metal particles added to the liquid media having the hydrogen peroxide therein, the oxidized metal particles coating the photoreactive catalyst to create oxidized metal catalyst particles;
   a reactor configured to receive the liquid media and the slurry containing the oxidized metal catalyst particles, wherein the reactor is further configured to promote turbulent mixing of the oxidized metal catalyst particles in the liquid media; and
   an irradiation source in the reactor irradiating the oxidized metal catalyst particles when at least some of the liquid media and the slurry containing the oxidized metal catalyst particles are present in the reactor, the irradiated oxidized metal catalyst particles catalyzing the decomposition of hydrogen peroxide molecules into oxygen and water.

2. A system according to claim 1, wherein the photoreactive catalyst is titanium dioxide ($TiO_2$).

3. A system according to claim 1, wherein the oxidized metal is ferric oxide ($Fe_2O_3$).

4. A system according to claim 1, wherein the reactor is a photocatalytic reactor and the irradiation source is a lamp configured to emit ultraviolet radiation.

5. A system according to claim 1, wherein a flow path through the reactor promotes the turbulent mixing within reactor.

6. A system according to claim 5, wherein the flow path comprises an annulus surrounding the irradiation source having a size of about 1 mm to 12 mm, wherein the liquid media, the slurry containing the oxidized metal catalyst particles is passed through the annulus at a flow rate of about 1 meter per second or more.

7. A system according to claim 1, further comprising a filter module for separating the oxidized metal catalyst particles from the liquid media.

* * * * *